W. H. BELTZ.
NUT LOCK.
APPLICATION FILED OCT. 5, 1908.

942,193.

Patented Dec. 7, 1909.

Witnesses
L. C. Whitten
T. J. McCormick

Inventor:
William H. Beltz
By Clifton P. Grant
Attorney.

UNITED STATES PATENT OFFICE.

WILLIAM H. BELTZ, OF SPRINGFIELD, OHIO, ASSIGNOR OF ONE-THIRD TO FRANK R. BELTZ, OF CLEVELAND, OHIO, AND ONE-THIRD TO CHARLES F. HUBER, OF SPRINGFIELD, OHIO.

NUT-LOCK.

942,193.        Specification of Letters Patent.        Patented Dec. 7, 1909.

Application filed October 5, 1908. Serial No. 456,170.

*To all whom it may concern:*

Be it known that I, WILLIAM H. BELTZ, a citizen of the United States, residing at Springfield, in the county of Clark and State of Ohio, have invented new and useful Improvements in Nut-Locks, of which the following is a specification.

My invention relates to nut-locks, more particularly to nut-locks for automobiles and other vehicles. It is a well known fact that great difficulty has hitherto been experienced by the manufacturers of automobiles and other vehicles of all descriptions in securing a nut to hold the wheel in place on the spindle of the axle so that there will be no danger from said wheel coming off the spindle while such automobile or other vehicle is in use. In automobiles especially this danger is very great by reason of the construction or connection of the rear axles of the machine with compensating gears, designed or intended to permit one of the rear wheels, in making sharp turns, to revolve for an instant in a direction opposite to that in which it ordinarily revolves when the machine is running in a forwardly direction, which has a tendency to loosen said nut. There are many other causes connected with the use of all vehicles which contribute to the danger incident to the use of the axle-nuts commonly in use, such as the backing of such vehicles, the constant jar to the nut when the vehicle is running over rough roads and paved streets, etc., and one of the objects of my invention is to provide a positive lock for axle nuts and other nuts, which will hold the nut in a fixed and firm position on the end of the spindle without any danger of same coming off until it is desired to release the lock and remove the nut, especially on machines like automobiles, which are run at a high rate of speed.

Another object of my invention is to provide a nut-lock which will be easy of operation and simple in construction, and which may be instantly unlocked at any time without the use of any tool whatever.

My invention consists of the constructions and combinations of parts hereinafter described and set forth in the accompanying drawings, in which—

Figure 2:
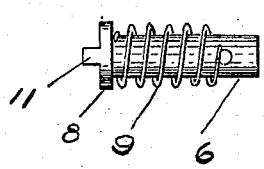
Figure 3:
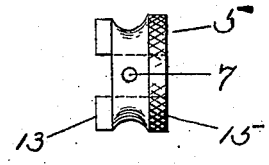
Figure 1:
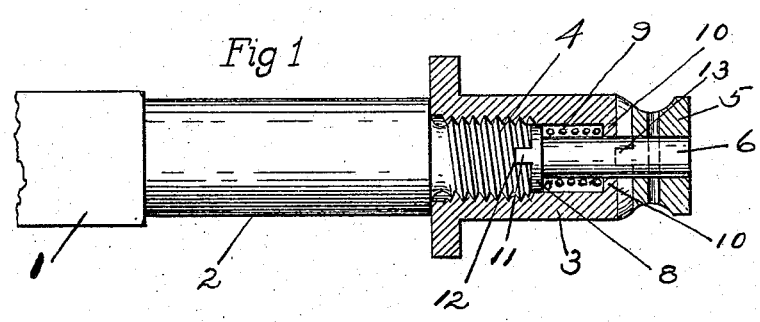
Figure 4:
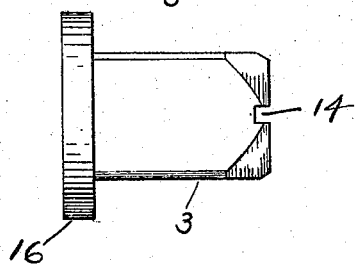
Figure 5:
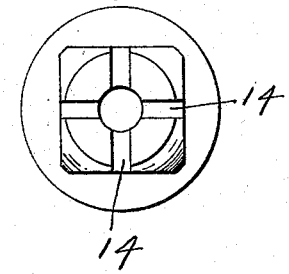

Figure 1 is a general view of my device showing the construction and operation thereof, the nut being in cross-section. Fig. 2 is a detail showing the shank of the nut-lock. Fig. 3 is a detail showing the cap of the nut-lock detached from said shank. Fig. 4 is a side elevation of the nut proper; and Fig. 5 is a top view of same.

In said drawings, similar parts are represented by similar reference numerals in the several views.

In Fig. 1 of said drawings, 1 represents the axle, with a spindle, 2, at the end thereof. A nut, 3, with the usual extended base 16, is screwed onto the screw-threaded end, 4, of said spindle in the usual manner. At the outer end of said nut, 3, is a cap, 5, through the center of which a shank, 6, passes, said shank being rigidly held in said cap by means of a pin, 7, passing through said cap and shank. The other end of said shank, 6, is enlarged at 8, to fit the bore of said nut 3. Said shank 6 also has a coil spring, 9, one end of which rests against the enlarged end, 8, of said shank, 6, the other end resting against shoulders, 10, in said nut 3. Said enlarged end, 8, of said shank, 6, has a lug, 11, which is held spring-pressed by the coil spring, 9, in a groove, 12, in the end of the screw-threaded portion of the spindle, when the nut is locked on the end of said spindle. The cap, 5, has lugs, 13, one on each side of the shank 6, which rest in grooves, 14, in the end of said nut, 3, when the device is locked, said lugs being firmly held in said grooves by said coil spring 9.

In Fig. 1 the device is shown in locked position. When it is desired to unlock same, the cap, 5, with the shank, 6, is pulled outwardly, against the tension of the coil spring 9, so that the lugs, 11 and 13, will be free of their respective grooves, 12 and 14, and given a slight turn. Said lug 11 then rests upon the outer end of said screw-threaded portion 4 of the spindle 2, and said lugs, 13, rest upon the end of said nut 3, all of said lugs being free from said grooves. The nut is then unscrewed from the end of the axle in the usual manner. When it is desired to lock the nut in position this operation is reversed.

In Fig. 5 I have shown grooves, 14, at right angles to each other. This is for the purpose of allowing the nut to be locked again upon a quarter turn if it is so desired.

It will be seen from the above description that the nut may be firmly locked to the end of the axle by means of this device, without any possibility of same being jarred loose or turned off until the cap, 5, is pulled out against the tension of the spring 9, said cap being knurled at 15 to facilitate this operation. It will also be seen that no part of the tension upon the lock itself, while in place, devolves upon the coil spring, as the only purpose said spring serves is to keep said lugs in their grooves.

It will be understood that I do not limit myself to the exact forms of parts shown and described, as the same could easily be varied without departing from the spirit of my invention.

Having thus described my invention, what I claim as new and desire to secure by Letters Patent is:

1. In a nut-lock device, the combination of an axle-spindle, a groove in the end thereof, with a nut adapted to be screwed onto the end of said spindle, a cap at the end of said nut having lugs on the inner face thereof, grooves in said nut to receive said lugs, a shank between said cap and said axle-spindle, a lug on the end of said shank to enter the groove in said spindle, and means for simultaneously locking said shank to said spindle and said cap to said nut, substantially as described.

2. In a nut-lock device, the combination of an axle-spindle, and a groove therein, with a nut adapted to be screwed onto the end of said spindle, a cap on the end of said nut, grooves in said nut, a shank extending from said cap into said nut, lugs on said cap adapted to enter said grooves in said nut, a lug on the end of said shank adapted to enter said groove in the end of said spindle, all of said lugs being held spring-pressed in said grooves when said device is in locked position, substantially as described.

3. A nut-locking device consisting of the combination of an axle-spindle, a groove in the end thereof, with a nut adapted to be screwed onto the end of said spindle, a cap on the end of said nut, grooves in said nut, a shank extending from said cap into said nut, lugs on said cap adapted to enter said grooves in said nut, a lug on the end of said shank adapted to enter said groove in the end of said spindle, a coil spring around said shank, and all of said lugs adapted to be held spring-pressed by said coil spring in their respective grooves when said device is locked, substantially as described.

In witness whereof I hereunto subscribe my name this 19th day of September, A. D. 1908.

WILLIAM H. BELTZ

Witnesses:
EDWIN S. HOUCK,
CHARLES F. BREITUNG.